(12) United States Patent
Suzuki et al.

(10) Patent No.: US 8,019,000 B2
(45) Date of Patent: Sep. 13, 2011

(54) MOTION VECTOR DETECTING DEVICE

(75) Inventors: Mitsuru Suzuki, Gifu (JP); Shigeyuki Okada, Ogaki (JP)

(73) Assignee: Sanyo Electric Co., Ltd., Osaka (JP)

( * ) Notice: Subject to any disclaimer, the term of this patent is extended or adjusted under 35 U.S.C. 154(b) by 1591 days.

(21) Appl. No.: 11/360,495

(22) Filed: Feb. 24, 2006

(65) Prior Publication Data

US 2006/0188021 A1   Aug. 24, 2006

(30) Foreign Application Priority Data

Feb. 24, 2005   (JP) ................................ 2005-049514
Mar. 25, 2005   (JP) ................................ 2005-087739

(51) Int. Cl.
*H04N 11/02*   (2006.01)
*H04N 7/12*   (2006.01)
*G06K 9/46*   (2006.01)

(52) U.S. Cl. ........... 375/240.16; 375/240.22; 348/416.1; 382/236; 382/253

(58) Field of Classification Search ............. 375/240.03, 375/240.12, 240.13, 240.16, 240.22, 240.23, 375/240.24; 348/394.1, 400.1, 401.1, 402.1, 348/407.1, 416.1; 382/236, 238, 246, 251, 382/253

See application file for complete search history.

(56) References Cited

U.S. PATENT DOCUMENTS

| 7,072,397 | B2 * | 7/2006 | Sriram et al. | 375/240.13 |
| 2001/0041013 | A1 * | 11/2001 | Yamashita et al. | 382/236 |
| 2003/0039311 | A1 * | 2/2003 | Ohira | 375/240.16 |
| 2003/0174769 | A1 * | 9/2003 | Nagumo et al. | 375/240.02 |
| 2003/0215015 | A1 * | 11/2003 | Ohira | 375/240.16 |
| 2004/0233989 | A1 * | 11/2004 | Kobayashi et al. | 375/240.16 |
| 2005/0062885 | A1 * | 3/2005 | Kadono et al. | 348/407.1 |

FOREIGN PATENT DOCUMENTS

| JP | 7-154801 | 6/1995 |
| JP | 08-172629 | 7/1996 |
| JP | 11-262015 | 9/1999 |
| JP | 11-298903 | 10/1999 |
| JP | 2002-305749 | 10/2002 |

OTHER PUBLICATIONS

Japanese Notification of Reasons for Refusal, with English Translation, issued in Japanese Patent Application No. JP 2005-049514, dated Jun. 16, 2009. Japanese Notification of Reason(s) for Refusal, with English translation thereof, issued in Patent Application No. JP 2005-049514 dated on Jul. 8, 2008.
Japanese Notification of Reason(s) for Refusal, with English translation thereof, issued in Patent Application No. JP 2005-087739 dated on Jul. 15, 2008.

* cited by examiner

*Primary Examiner* — Young T. Tse
(74) *Attorney, Agent, or Firm* — McDermott Will & Emery LLP

(57) ABSTRACT

A frame memory holds a reference frame that is to be referenced for motion detection for a target block of a coding target frame in motion images. A motion compensation unit that includes a motion detecting unit and a motion compensated prediction unit. The motion detecting unit detects the motion of said target block by repeated motion estimation with reference to said reference frame stored in said frame memory, and the motion compensated prediction unit performs motion compensation processing for the target block using information on the detected motion. A coding unit that performs coding processing for the subtraction image and the information on the detected motion and thereby creates a coded stream. The motion compensation unit includes a pre-reading memory which stores pixel data beforehand, where said pixel data is part of pixel data in said reference frame, which is to be frequently referenced for motion detection, and which has been transmitted from said frame memory.

13 Claims, 11 Drawing Sheets

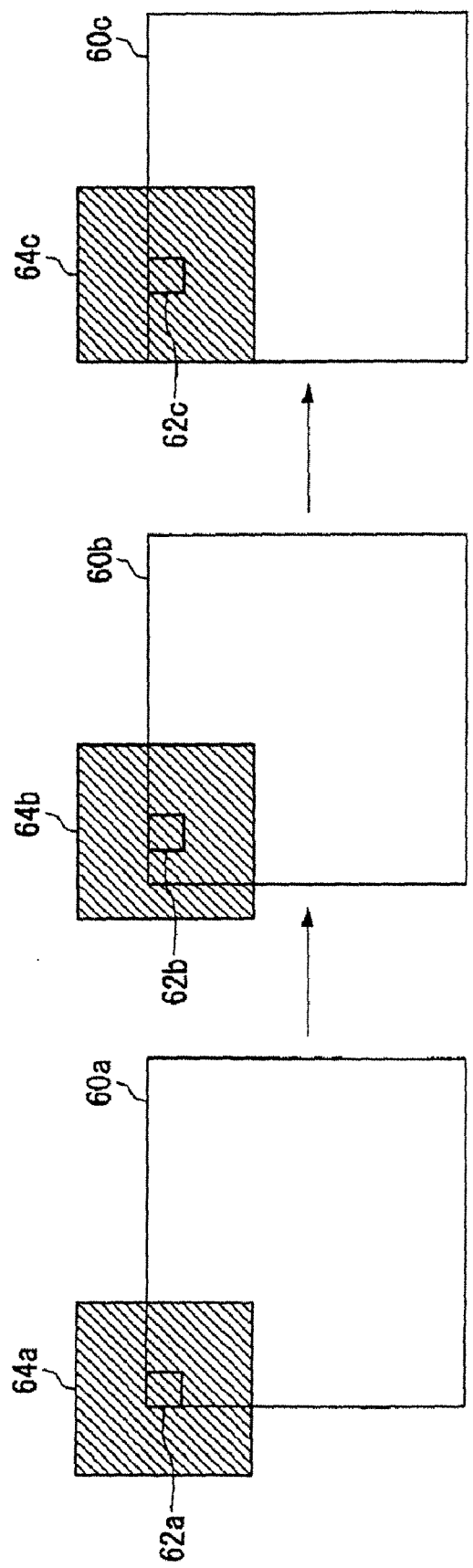

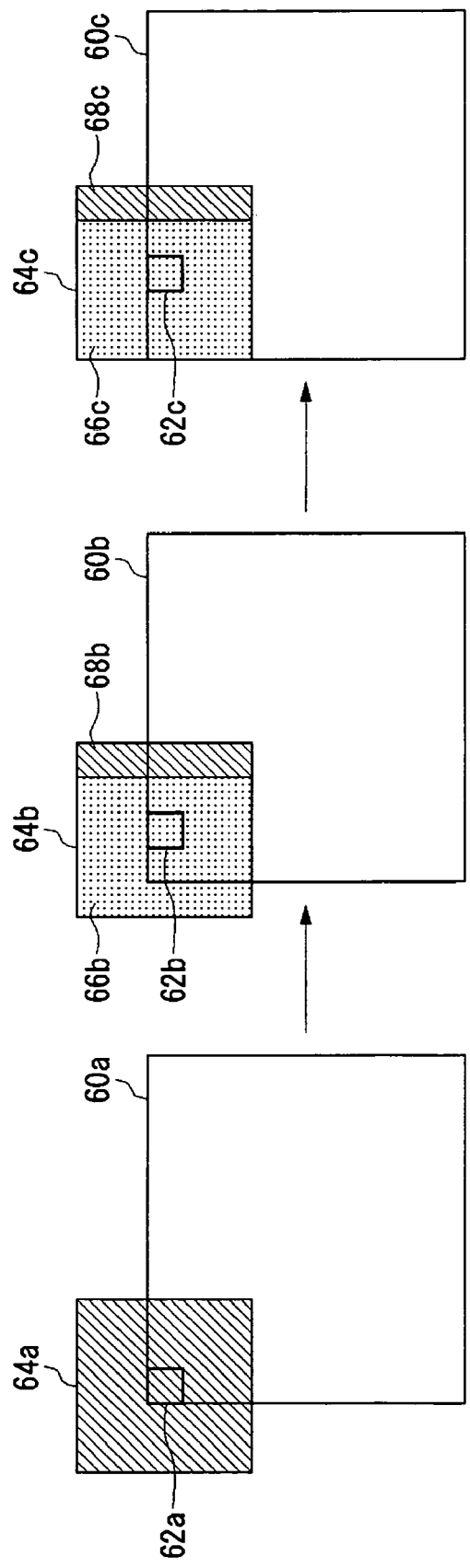

MOTION VECTOR DETECTING DEVICE

BACKGROUND OF THE INVENTION

1. Field of the Invention

The present invention relates to a motion vector detection technique, e.g., a device having a function for detecting an interframe motion vector for coding motion images with an image coding method including an interframe prediction mode.

2. Description of the Related Art

The rapid development of the broadband network has increased consumer expectations for the service that provide high-quality motion images. On the other hand, large capacity storage media such as DVD and so forth are used for storing high-quality motion images. This increases the segment of the users who enjoy high-quality images. A compression coding method is an indispensable technique for transmission of motion images via a communication line, and storing the motion images in a storage medium. Examples of international standards of motion image compression coding techniques include the MPEG-4 standard, and the H.264/AVC standard. Furthermore, SVC (Scalable Video Coding) is known, which is a next-generation image compression technique that includes both high image quality stream and low image quality stream functions.

With compression coding and decoding of motion images, the motion images are stored in frame memory in increments of frames, and motion compensation is performed with reference to the frame memory. This requires high frequency data transmission from the frame memory. In particular, creation of higher quality motion images requires motion detection in increments of blocks each of which is formed of a small number of image pixels. This increases the data amount used for the motion compensation. Accordingly, the demand for memory bandwidth can easily lead to a bottleneck in the processing. The Japanese Patent Application Laid-open No. 11-298903 discloses a digital image decoding device having a function of improving the bandwidth usage efficiency of frame memory.

On the other hand, the Japanese Patent Application Laid-open No. 11-262015 discloses a hierarchical motion vector detection method as follows. First, a coding target image is reduced to a reduced image at a reduced resolution. Then, an approximate motion vector is detected based upon the reduced image thus obtained. Subsequently, the motion vector is detected based upon the original image at the original resolution with reference to the approximate motion vector.

At the time of compression coding of motion images, motion detection is performed for the target macro block of a coding target frame. With the motion detection, the macro block matching the target macro block is detected within the pixel region corresponding to a predetermined search region in a reference frame while reading out the pixel region from the frame memory. With such motion detection, the macro block matching the target macro block is detected within the reference frame by repeated detection. This requires a great number of readouts from the frame memory, increasing the data transmission amount. Such data transmission takes up most of the transmission bandwidth of the frame memory. As a result, access to the frame memory becomes bottlenecked, leading to a problem of reduced processing speed for the compression coding.

On the other hand, with the aforementioned hierarchical motion vector detection method, a portion of the reference image corresponding to the detection region is read out from the frame memory, and a reduced image is created based upon this partial image thus read out, for each coding target macro block. This requires extremely high frequency data exchange via a memory bus, leading to a bottlenecking problem, i.e., a problem of limited processing speed.

SUMMARY OF THE INVENTION

The present invention has been made in view of the aforementioned problems. Accordingly, it is an object thereof to provide a coding technique for motion images, which enables the coding processing efficiency to be improved while reducing time necessary for detection of the motion vector.

A first aspect of the present invention relates to a motion vector detecting device. The motion vector detecting device detects a motion vector between a first image and a second image used as a reference image of the first image. The motion vector detecting device comprises: a reduced image creation unit which acquires the second image and creates a reduced image at a lower resolution than that of the original image; a reduced image holding unit which holds at least a part of the reduced image; and a computation unit which detects a motion vector by matching computation between images. With such an arrangement, the computation unit detects a motion vector by matching computation between the first image and the second image at the original resolution with reference to another motion vector acquired by matching computation between the reduced images of the first image and the second image. At the time of detection of the motion vector using the reduced image, a part of the reduced image stored in the reduced image holding unit is read out from the reduced image holding unit. With such an arrangement, there is no need to newly create a reduced image held by the reduced image holding unit, thereby improving the processing speed.

The reduced image holding unit may comprise memory which can hold the entire reduced image of the second image. Furthermore, the reduced image holding unit may store the reduced image in a manner in which the pixel positions in the reduced image correspond to the positions in the reduced image holding unit. With such an arrangement, memory having a sufficient storage capacity is provided, thereby improving the processing speed. Furthermore, the image data may be stored in the memory in the same order in which the actual image is read therefrom and written thereto. Such an arrangement facilities control of readout and writing processing, as well as enabling high-speed readout and wiring processing.

The reduced image holding unit may store a region which is included in the reduced image and which is necessary for the next motion vector detection. This improves the processing speed while reducing the storage capacity of the reduced image holding unit.

The computation unit may detect the motion vector for each macro block having a predetermined size. With such an arrangement, the reduced image created for motion vector detection for each macro block is stored in the reduced image holding unit. This suppresses the amount of the newly created reduced-image for motion vector detection for the following macro block to a minimum.

A second aspect of the present invention relates to an image coding device. The image coding device performs coding of motion images so as to create a coded data stream. The image coding device according to the second aspect comprises: a motion vector detection unit which detects a motion vector between a first image and a second image which serves as a reference image of the first image; and a coding unit for performing coding of the first image using the motion vector thus obtained. The aforementioned motion vector detecting unit includes: a reduced image creation unit which acquires the second image, and creates a reduced image at a lower resolution than the original image; a reduced image holding unit which holds at least a part of the reduced image; and a computation unit which detects a motion vector by performing matching computation between these images. The aforementioned computation unit detects another motion vector by performing matching computation between the first image and the second image at the original resolution with reference to the motion vector obtained by matching computation between the reduced image of the first image and the reduced image of the second image. Before the motion vector is detected based upon the reduced images, a part of the reduced image held by the reduced image holding unit is read out from the reduced image holding unit.

A third aspect of the present invention relates to a motion vector detecting method. With the motion vector detecting method, a motion vector is detected between a first image and a second image which serves as a reference image of the first image. The motion vector detecting method comprises: a step in which the second image is acquired, and a reduced image at a lower resolution than that of the original image is created; a step in which matching computation is performed between the reduced image of the first image and the reduced image of the second image so as to detect an approximate motion vector; a step in which matching computation is performed between the first image and the second image at the original resolution so as to detect a motion vector; and a step in which at least a part of the reduced image is stored in a reduced image holding unit for holding a reduced image. With such a method, before the motion vector is detected based upon the reduced images, a part of the reduced image held by the reduced image holding unit is read out from the reduced image holding unit.

A fourth aspect of the present invention relates to a coding device which performs coding of frames of motion images. The coding device comprises: frame memory which holds a reference frame that is used as a reference for motion detection for a target block of a coding target frame; and a motion detecting unit which detects the motion of the target block by repeated motion estimation with reference to the reference frame stored in the frame memory. With such an arrangement, the motion detecting unit includes pre-reading memory which stores pixel data beforehand, where the pixel data is a part of pixel data in the reference frame, which is frequently used as a reference for motion detection, and which has been transmitted from the frame memory.

The term "pixel data which is frequently used as a reference" as used here represents the pixel data of a region which can be repeatedly used as a reference a predetermined number or more of times.

Such an aspect enables the data transmission amount from the frame memory to be reduced.

A fifth aspect of the present invention relates to a coding method. With the coding method, at the time of motion detection for a target block in a coding target frame in motion images, pixel data which is a part of pixel data in motion search region within the reference frame and is frequently used as a reference is transmitted beforehand from frame memory holding a reference frame to pre-reading memory. In a case that the pre-reading memory holds the pixel data to be used as a reference for motion estimation, the pixel data held by the pre-reading memory is used as a reference for motion estimation. Otherwise, in a case that the pre-reading memory does not hold the pixel data to be used as a reference for motion estimation, the pixel data held by the frame memory is used as a reference for motion estimation.

Note that any combination of the aforementioned components or any manifestation of the present invention realized by modification of a method, device, system, computer program, and so forth, is effective as an embodiment of the present invention.

BRIEF DESCRIPTION OF THE DRAWINGS

FIGS. 3A-3C are diagrams for describing a conventional detecting procedure for a motion vector;

FIGS. 4A-4C are diagrams for describing a detecting procedure for a motion vector according to the present embodiment;

DETAILED DESCRIPTION OF THE INVENTION

First Embodiment

With an image coding device according to an embodiment of the present invention, first, a reduced image at a reduced resolution is created based upon an image which is to be coded. Then, a rough motion vector (which will be referred to as "approximate motion vector" hereafter) at a low resolution is detected based upon the reduced image. Subsequently, the motion vector is detected based upon the original image at a high resolution with reference to the approximate motion vector. The present invention offers a technique which can be applied to such a hierarchical motion vector detection method, and which improves the motion vector detection speed while reducing the memory access amount.

Figure 1:
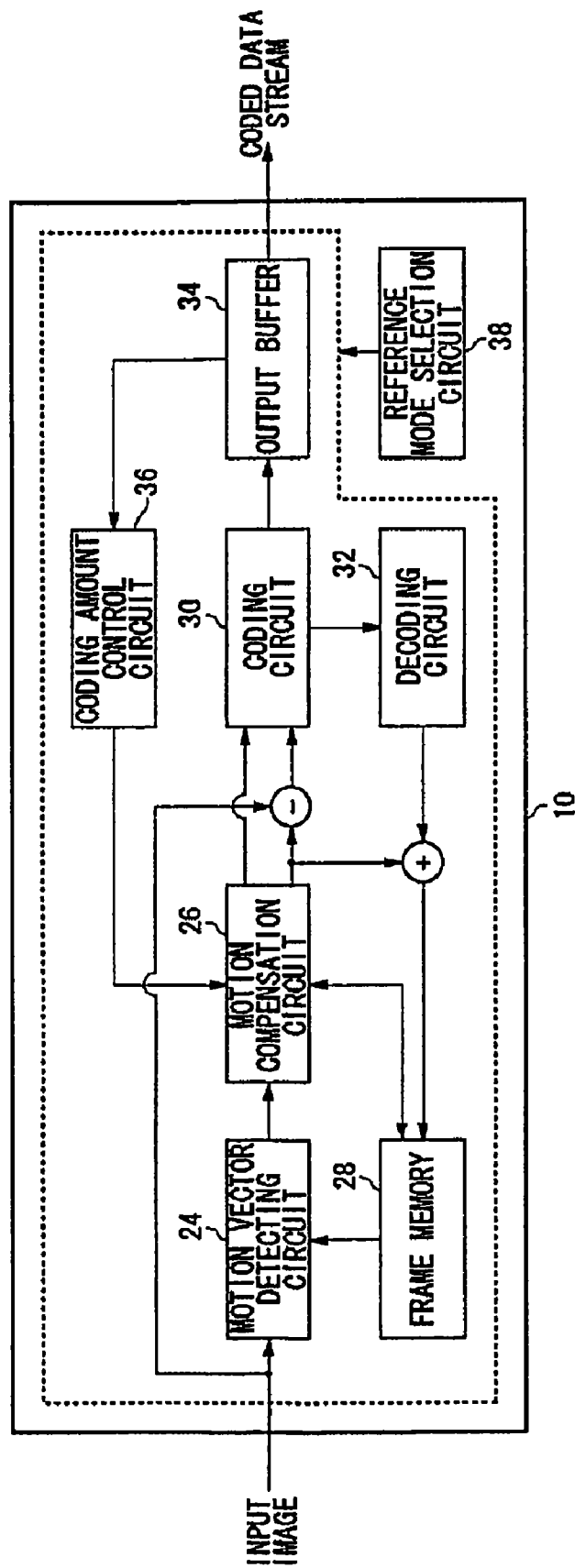
FIG. 1 is a diagram which shows an overall configuration of an image coding device according to an embodiment of the present invention.

FIG. 1 shows an overall configuration of an image coding device 10 according to an embodiment of the present invention. The image coding device 10 includes a motion vector detecting circuit 24, a motion compensation circuit 26, frame memory 28, a coding circuit 30, a decoding circuit 32, an output buffer 34, a coding amount control circuit 36, and a reference mode selecting circuit 38. Part or all of the aforementioned components may be realized by hardware means, e.g., by actions of a CPU, memory, and other LSIs of a computer, or by software means, e.g., by actions of a program or the like, loaded into the memory. Here, the drawing shows a functional block configuration which is realized by cooperation between the hardware components and software components. It is needless to say that such a functional block configuration can be realized by hardware components alone, software components alone, or various combinations thereof, which can be readily conceived by those skilled in this art.

The image (which will be referred to as "input image" hereafter) input to the image coding device 10 from an external device is transmitted to the motion vector detecting circuit 24. The motion vector detecting circuit 24 detects a motion vector by making comparison between the input image and an image (which will be referred to as "reference image" hereafter) stored in the frame memory 28 beforehand, which serves as a reference for motion vector prediction. The motion compensation circuit 26 acquires a quantization step size for quantization of the image, from the coding amount control circuit 36, and determines a quantization coefficient and a prediction mode for the macro block. The motion vector detected by the motion vector detecting circuit 24, and the quantization coefficient and the macro block prediction mode determined by the motion compensation circuit 26, are transmitted to the coding circuit 30. Furthermore, the motion compensation circuit 26 transmits the differences between the predicted values and the actual values for the macro block, each of which is prediction deviation, to the coding circuit 30.

The coding circuit 30 performs coding of the prediction deviation using the quantization coefficient, and transmits the quantized prediction deviation to the output buffer 34. Furthermore, the coding circuit 30 transmits the quantized prediction deviation and the quantization coefficient to the decoding circuit 32. The decoding circuit 32 performs decoding of the quantized prediction deviation based upon the quantization coefficient, creates a decoded image by adding the decoded prediction deviations and the prediction values received from the motion compensation circuit 26, and transmits the decoded image thus created, to the frame memory 28. The decoded image is transmitted to the motion vector detecting circuit 24, and is used as a reference image for coding the images that follow. The coding amount control circuit 36 acquires how full the output buffer 34 is, and determines the quantization step size used for the next quantization based upon the degree how full the output buffer 34 is.

The reference mode selecting circuit 38 selects a reference mode from the intra-frame coding mode, the forward inter-frame prediction coding mode, and the bi-directional inter-frame prediction coding mode, and outputs the prediction mode information for the frame thus determined, to other circuits.

Figure 2:
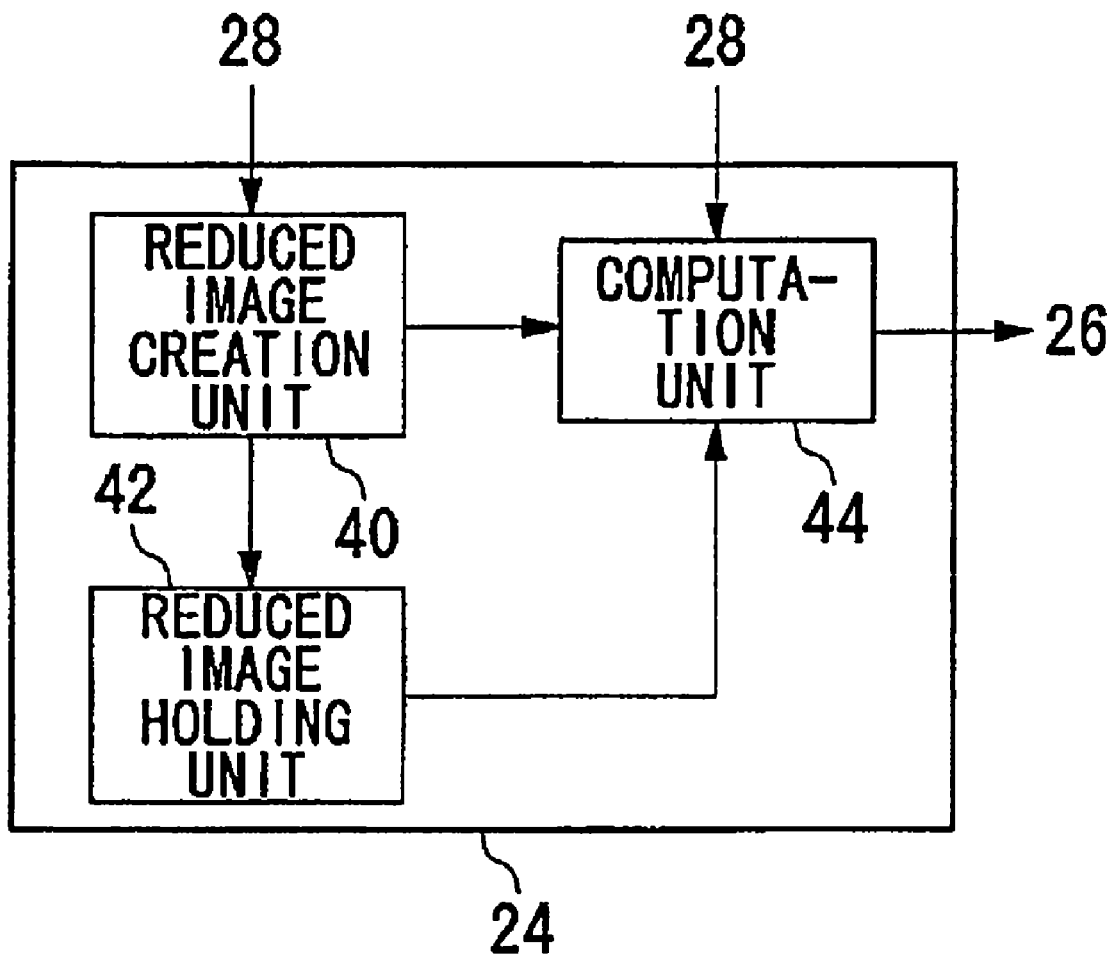
FIG. 2 is a diagram which shows an internal configuration of a motion vector detecting circuit.

FIG. 2 shows an internal configuration of a motion vector detecting circuit. The motion vector detecting circuit 24 includes a reduced image creation unit 40, a reduced image holding unit 42, and a computation unit 44. The reduced image creation unit 40 acquires the input image and the reference image stored in the frame memory 28, and reduces these image into the respective reduced images with predetermined resolutions. The reduced image creation unit 40 may reduce these images by any technique. Examples of such image reduction techniques include: a method of thinning out the pixels of the image; and a method in which the image is divided into blocks of a predetermined size, and the average of the pixel values included in each block is used as a pixel value of a reduced image. The computation unit 44 computes the difference (prediction deviation) between the macro block (coding target macro block) which serves as a coding target block in the input image and each macro bock in the search region in the reference image, searches the reference image search region for the macro block which exhibits the smallest difference, thereby detecting the motion vector. The reduced image holding unit 42 comprises memory such as SDRAM or the like. The reduced image holding unit 42 holds a part or all of the reduced image created by the image creation unit 40, as described later. A part of the frame memory 28 may be used as the reduced image holding unit 42. Also, the reduced image holding unit 42 may share a single memory unit with the frame memory 28.

The present embodiment offers hierarchical motion vector detection. That is to say, first, the approximate motion vector is detected based upon a reduced image at a low resolution. Then, the motion vector is detected based upon the image at a high resolution with reference to the approximate motion vector. First, the reduced image creation unit 40 creates a reduced coding target macro block within the input image, and a reduced image of the reference image search region. Subsequently, the computation unit 44 acquires the reduced coding target macro block and the reduced search region, and performs block matching, thereby detecting the approximate motion vector. Next, the computation unit 44 acquires the coding target macro block and the original image search region, and block matching is performed with respect to the blocks which have been roughly selected based upon the approximate motion vector thus detected, thereby detecting the motion vector. The computation unit 44 performs motion vector detection in increment of macro blocks with a predetermined size, e.g., with a width of 16 pixels and a height of 16 pixels.

FIGS. 3A-3C are diagrams for describing a conventional detection procedure for the motion vector. FIG. 3A shows the search region for detecting the motion vector of the upperleft macro block within the input image. In a reference image 60a, a region 64a including a macro block 62a, situated at the same position as that of the coding target macro block within the input image, is set to the search region. In this example, each macro block is 16 pixels wide and 16 pixels high. The search region 64a is 80 pixels wide and 80 pixels high.

The reduced image creation unit 40 reads out the pixel data of the coding target macro block within the input image from the frame memory 28, converts the image thus read out into a ¼ reduced image, thereby creating a reduced image with a width of 4 pixels and a height of 4 pixels. Furthermore, the reduced image creation unit 40 reads out the pixel data of the search region 64a from the frame memory 28, converts the image thus read out into a ¼ reduced image, thereby creating a reduced image with a width of 20 pixels and a height of 20 pixels. The computation unit 44 detects the approximate motion vector using these reduced images. Subsequently, the computation unit 44 acquires the coding target macro block and the original image of the reference image search region, and detects the motion vector based upon the macro block and the original image of the search region thus acquired, with reference to the approximate motion vector.

Upon detection of the motion vector, the coding target macro block is shifted to the right adjacent block as shown in FIG. 3B. Then, the motion vector detecting circuit 24 detects the motion vector in the same way. Upon completion of detection of the motion vectors up to the macro block at the far right of row in the input image, the target macro block is set to a block at a position in the next row. In this manner, the motion vector is detected for each one of all the macro blocks within the input image.

FIGS. 4 and 5 are diagrams for describing a detection procedure for the motion vector according to the present embodiment. FIG. 4A shows a search region for detecting the motion vector of the upper-left macro block in the input image. In the same way as shown in FIG. 3A, first, a reduced image of the search region 64a is created, and the approximate motion vector is detected based upon the reduced image thus obtained. Subsequently, the motion vector is detected based upon the original image. In this step, the reduced image of the search region 64*a* created by the reduced image creation unit 40 is stored in the reduced image holding unit 42.

With this arrangement, the reduced image holding unit 42 comprises memory which has the capacity to store the reduced images of all the search regions 64 used for detection of the motion vectors of all the macro blocks within the input image of one frame. That is to say, the reduced image holding unit 42 comprises memory which has the capacity to store around one frame of the reduced image of the reference image. Let us consider an arrangement in which at the time of detection of the motion vector of the macro block around the edge of the input image, a search region includes a region outside of the reference image, as shown in FIG. 4A. With such an arrangement, the reduced image holding unit 42 requires additional memory capacity for storing the region outside of the reference image.

Next, as shown in FIG. 4B, the target macro block for detection of the motion vector is shifted to the adjacent macro block to the right. First, the reduced image of the search region 64*b* is created. In this case, the reduced image of the region 66*b,* which overlaps with the search region 64, has already been created and is stored in the reduced image holding unit 42. With the present embodiment, the reduced image of the region 66*b* is not newly created, but read out from the reduced image holding unit 42. On the other hand, the reduced image creation unit 40 reads out the pixel data of the region 68*b* alone, which does not overlap with the search region 64*a,* from the frame memory 28, and creates a reduced image of the region 68*b.* Note that the reduced image of the region 68*b* thus newly created is stored in the reduced image holding unit 42.

As shown in FIG. 4C, in the same way, there is no need to newly create the reduced image over the entire search region 64*c* for the following detection of the motion vector for each macro block. Specifically, while only the reduced image of the region 68*c* is newly created, the reduced image of the region 66*c* does need to be created, and is read out from the reduced image holding unit 42.

Figure 5C:
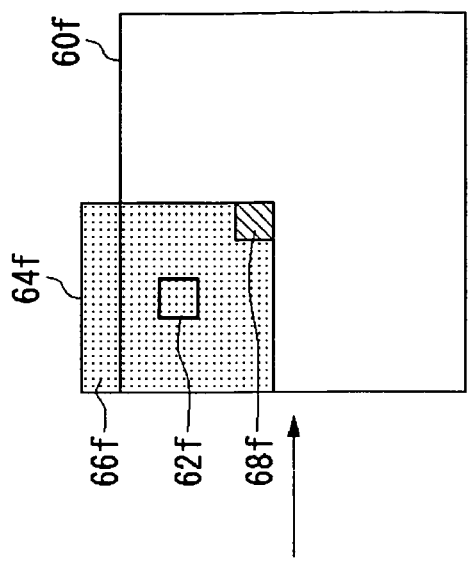
FIGS. 5A-5C are diagrams for describing the detecting procedure for a motion vector according to the present embodiment.
Figure 5B:
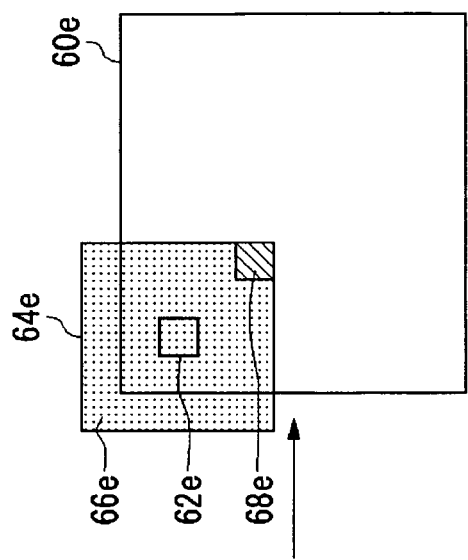
Figure 5A:
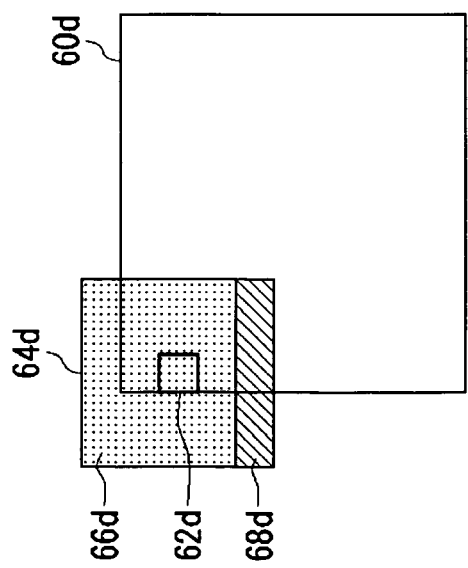

FIGS. 5A-5C are diagrams for describing the procedure for detecting a motion vector for a macro block in the second or subsequent row within the input image. Let us consider detection of the motion vector for the leftmost macro block in the second row as shown in FIG. 5A. In this case, while only the reduced image of the region 68*d,* which is a part of the search region 64*d,* is newly created, the reduced image of the region 66*d,* which is the other part of the search region 64*d,* is read out from the reduced image holding unit 42.

Then, let us consider detection of the motion vector for the second or subsequent macro block in the second row as shown in FIGS. 5B and 5C. In this case, the region which require new creation of the reduced image is only the lower-right region of the search region, i.e., the region 68*e* in the search region 64*e* and the region 68*f* in the search region 64*f.*

As described above, with the present embodiment, the reduced image holding unit 42 is provided. With such an arrangement, the computation unit 44 does not need to acquire the original image of the entire reference image search region from the frame memory 28, and does not need to newly create the reduced image of the entire search region thus acquired, for detecting the approximate motion vector based upon the reduced image for each coding target macro block. That is to say, such an arrangement enables detection of the approximate motion vector using the reduced image of the reference image, which has been created beforehand in the previous detection of the approximate motion vector and is stored in the frame memory 28, as a part of the reduced image of the current reference image search region. This markedly reduces the amount of memory access to the frame memory 28, thereby improving the processing speed for the motion vector detection. Furthermore this improves the detection precision for the motion vector.

Now, let us make a comparison in the memory transmission amount between the methods shown in FIGS. 4A-4C and 5A-5C. With the arrangement shown in FIGS. 3A-3C, the original image of the search region 64 is read out from the frame memory 28 for each macro block. Accordingly, there is a need to transmit 80×80 pixel data, i.e., 6400 pixels data, for each macro block. On the other hand, let us consider an arrangement shown in FIGS. 4 and 5. Such an arrangement also requires the same memory transmission amount as that required for the arrangement shown in FIGS. 3A-3C for the first detection of the motion vector, i.e., for the first macro block on the uppermost row. However, such an arrangement requires a smaller memory transmission amount as that required for the arrangement shown in FIGS. 3A-3C for the second or subsequent macro block on the uppermost or subsequent row. Let us consider the data transmission amount for the second macro block in the uppermost row. In this case, as shown in FIG. 4B, the image data of the region 68*b* is read out from the frame memory 28 in the form of an original image. Accordingly, with regard to the region 68*b,* the image data with a size of 80×16 pixels (1280 pixels) is read out. On the other hand, the image data of the region 66*b* is read out from the reduced image holding unit 42 in the form of a reduced image. Accordingly, with regard to the region 66*b,* image data with a size of 20×16 pixels (320 pixels) is read out. Subsequently, the reduced image of the region 68*b* newly created is stored in the reduced image holding unit 42. In this case, image data with a size of 20×4 pixels (80 pixels) is written to the reduced image holding unit 42. As a result, a total pixel data of 1680 pixels is transmitted. In this case, the data transmission amount equals 26% of that with the arrangement shown in FIGS. 3A-3C.

Then, let us consider the data transmission amount for the second or subsequent macro block in the second or subsequent row. In this case, as shown in FIG. 5B, the image data of the region 68*e* is read out from the frame memory 28 in the form of an original image. Accordingly, with regard to the region 68*e,* image data with a size of 16×16 pixels (256 pixels) is read out. On the other hand, the image data of the region 66*e* is read out from the reduced image holding unit 42 in the form of a reduced image. Accordingly, with regard to the region 66*e,* image data with a size of 20×16+16×4 pixels (384 pixels) is read out. Subsequently, the reduced image of the region 68*e* newly created is stored in the reduced image holding unit 42. In this step, image data with a size of 4×4 pixels (16 pixels) is read out. As a result, a total pixel data of 656 pixels is transmitted. In this case, the data transmission amount equals 10% of that with the arrangement shown in FIGS. 3A-3C.

The reduced image holding unit 42 may holds the pixel data in the same order in which the reduced image is read therefrom and written thereto. This facilitates control of readout/writing of a reduced image, as well as enabling high-speed readout/writing of the reduced image.

Figure 6A:
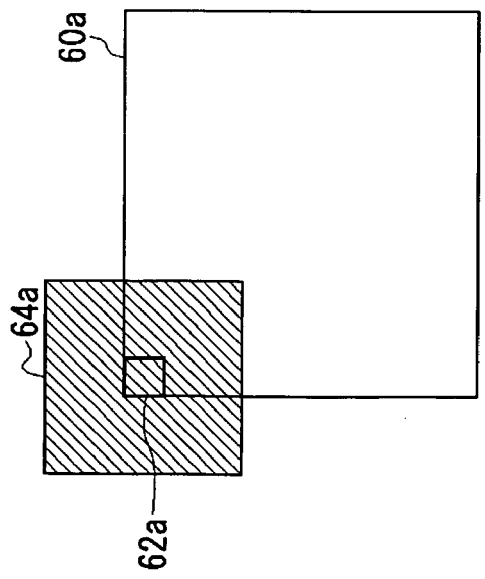
FIGS. 6A-6F are diagrams for describing another example of the detecting procedure for a motion vector according to the present embodiment.
Figure 6B:
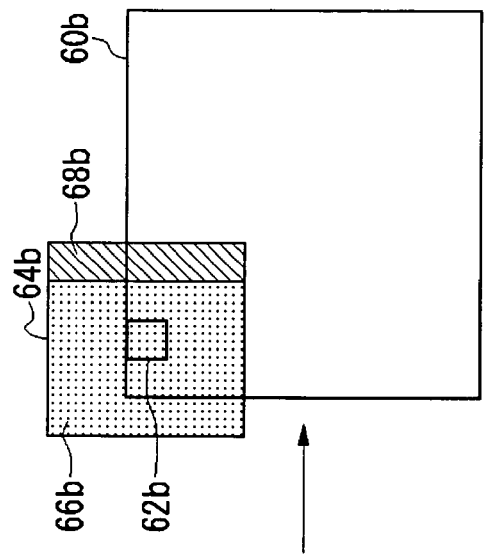
Figure 6C:
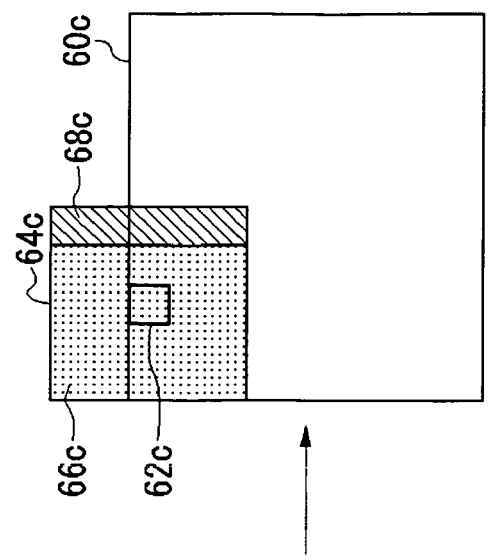
Figure 6D:
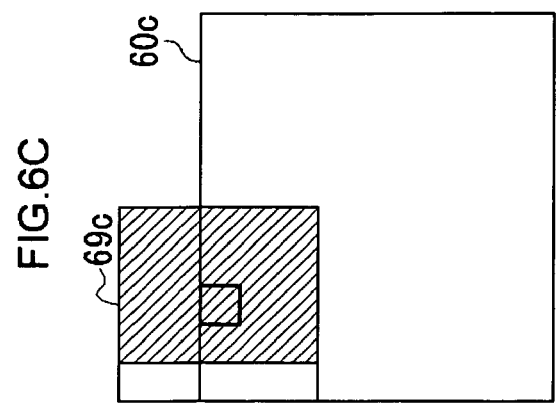

FIGS. 6A-6F are diagrams for describing another arrangement of the detection procedure for the motion vector according to the present embodiment. With the present arrangement, the reduced image holding unit 42 does not hold the entire reduced image of the search region 64, but stores only the region which overlaps with the next search region used for the next motion vector detection. Specifically, first, as shown in FIG. 6A, the reduced image of the search region 64*a* is created for detecting the motion vector of the upper-left macro block. In this step, as shown in FIG. 6D, the reduced image holding unit 42 holds the reduced image of the region 69*a* which overlaps with the search region 64*b* used for the next motion vector detection for the adjacent macro block to the right.

Figure 6E:
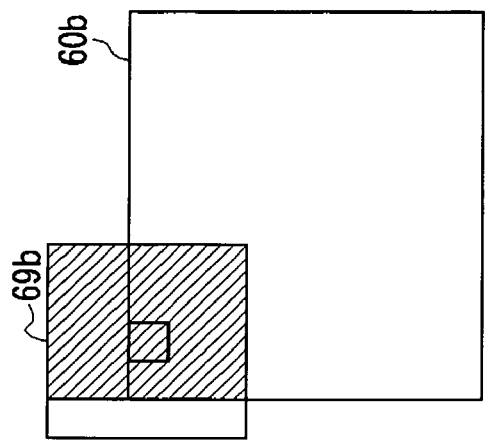
Figure 6F:
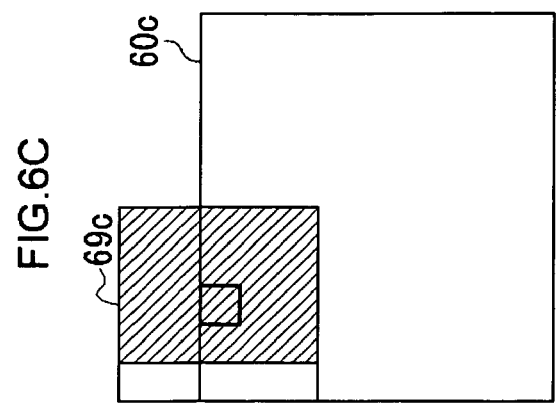

Next, the motion vector is detected for the second macro block on the uppermost row as shown in FIG. 6B. In this case, the region 66*b*, which is a part of the search region 64*b*, overlaps with the previous search region 64*a*. With the present arrangement, the image data of the region 66*b* is read out from the reduced image holding unit 42 in the form of a reduced image. On the other hand, the image data of the region 68*b* which does not overlap with the previous search region 64*a* is read out from the frame memory 28 in the form of an original image. Then, the reduced image of the region 68*b* is newly created based upon the image data thus read out. In this step, as shown in FIG. 6E, the reduced image holding unit 42 holds the reduced image of the region 69*b* which overlaps with the search region 64*c* used for the next motion vector detection for the adjacent macro block to the right, in the form of overwritten data.

Description will be made regarding evaluation results for the data transmission amount to/from memory. Let us consider the data transmission amount for the second or subsequent macro block in each row. In this case, as shown in FIG. 6B, the image data of the region 68*b* is read out from the frame memory 28 in the form of an original image. Accordingly, with regard to the region 68*b*, image data with a size of 80×16 pixels (1280 pixels) is read out. On the other hand, the image data of the region 66*b* is read out from the reduced image holding unit 42 in the form of a reduced image. Accordingly, with regard to the region 66*b*, image data with a size of 20×16 pixels (320 pixels) is read out. Subsequently, the reduced image of the region 69*b* newly created is stored in the reduced image holding unit 42. In this case, image data with a size of 20×16 pixels (320 pixels) is written to the reduced image holding unit 42. As a result, a total pixel data of 1920 pixels is transmitted. In this case, the data transmission amount equals 30% of that with the arrangement shown in FIGS. 3A-3C.

The present arrangement includes the reduced image holding unit 42 formed of memory having sufficient capacity to hold a reduced image of the region 69. Thus, the present arrangement provides the advantage of the reduced data transmission amount to/from the memory while suppressing costs, size, weight, power consumption, and so forth.

An arrangement employing any one of the aforementioned techniques provides the advantage of a reduced amount of access to the frame memory 28, thereby enabling high-speed and high-resolution image coding.

Description has been made regarding an arrangement in which the reduced image holding unit 42 stores a reduced image in the same pixel order as that in which the reduced image is read into and output from the memory. Also, an arrangement may be made in which a newly created reduced image of the region 68 overwrites the data for the region where the previously created reduced image is not used for the following motion vector detection. Such an arrangement allows the necessary storage capacity of the reduced image holding unit 42 to be reduced. Also, an arrangement may be made in which the reduced image of the input image is stored in the reduced image holding unit 42 for the following processing in the same way as with the reference image. This further reduces the memory access amount, thereby further improving the processing speed.

Description has been made regarding an arrangement in which the reduced image creation unit 40 creates the reduced images of the input image and the reference image. Also, an arrangement may be made in which the reduced image of the input image is created by another component, and is input to the motion vector detecting circuit 24.

Second Embodiment

Figure 7:
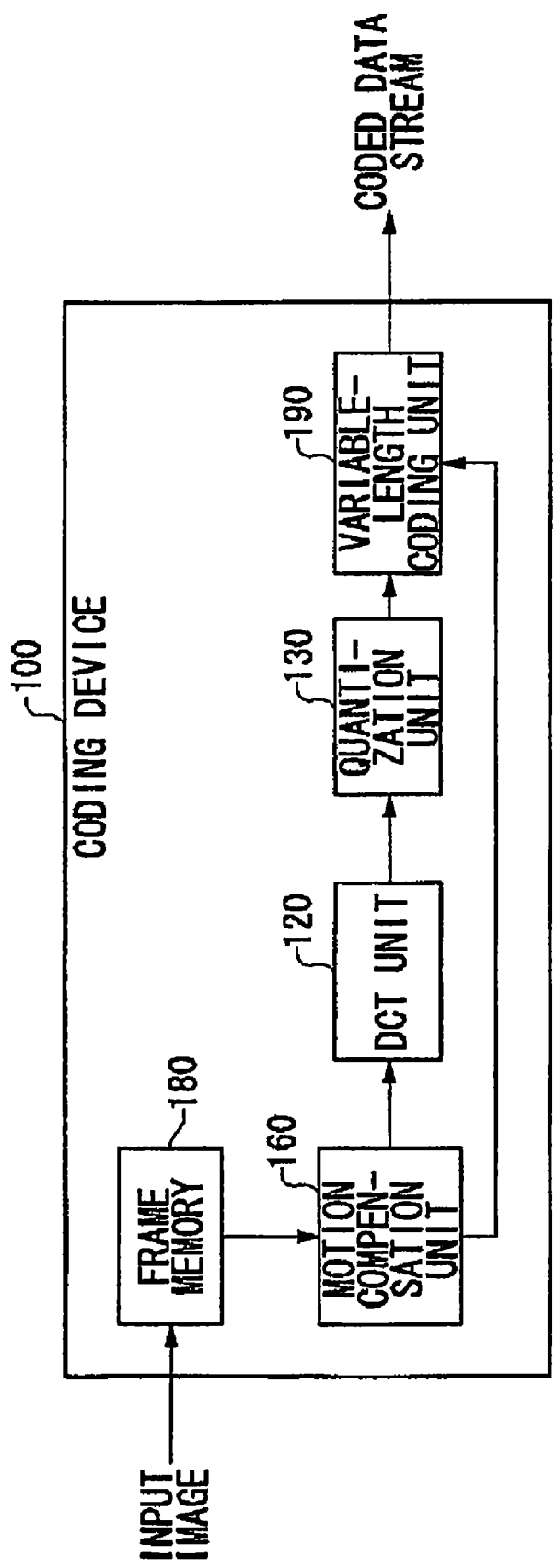
FIG. 7 is a configuration diagram which shows a coding device according to an embodiment.

FIG. 7 is a configuration diagram which shows a coding device 100 according to an embodiment. This configuration can be realized by hardware means, e.g., by actions of a CPU, memory, and other LSIs, of a computer, or by software means, e.g., by actions of a program having a function of image coding or the like, loaded into the memory. Here, the drawing shows a functional block configuration which is realized by cooperation between the hardware components and software components. It is needless to say that such a functional block configuration can be realized by hardware components alone, software components alone, or various combinations thereof, which can be readily conceived by those skilled in this art.

The coding device 100 according to the present embodiment performs coding of motion images stipulated by: the MPEG series standard, which is a member of the ISO/IEC family of standards; the H.26x series standard, which is a member of the ITU-T family of standards; or the H.264/AVC standard, which is a state-of-the-art motion image compression coding standard developed based upon both the aforementioned groups of standards.

With the MPEG series standard, in a case of coding an image frame in the intra-frame coding mode, the image frame to be coded is referred to as "I (Intra) frame". In a case of coding an image frame with a prior frame as a reference image, i.e., in the forward interframe prediction coding mode, the image frame to be coded is referred to as "P (Predictive) frame". In a case of coding an image frame with a prior frame and an upcoming frame as reference images, i.e., in the bi-directional interframe prediction coding mode, the image frame to be coded is referred to as "B frame".

On the other hand, with the H.264/AVC standard, image coding is performed using a reference image regardless of the time at which the reference image has been acquired. For example, image coding may be made with two prior image frames as reference images. Also, image coding may be made with two upcoming image frames as reference images. Furthermore, the number of the image frames used as the reference images is not restricted in particular. For example, image coding may be made with three or more image frames as the reference images. Note that, with the MPEG-1/2/4 standard, the term "B frame" represents the bi-directional prediction frame. On the other hand, with the H.264/AVC standard, the time at which the reference image is acquired is not restricted in particular. Accordingly, the term "B frame" represents the bi-predictive prediction frame.

Note that, in the present specification, the term "frame" and the term "picture" have the same meaning. Accordingly, the terms "I frame", "P frame", and "B frame" as used here have the same meanings as those of the terms "I picture", "P picture", and "B picture", respectively.

The coding device 100 receives the input motion images in increments of frames, performs coding of the motion images, and outputs a coded stream. The motion image frames thus input are stored in frame memory 180.

A motion compensation unit 160 performs motion compensation for each macro block of a P frame or B frame with a prior or upcoming image frame stored in the frame memory 180 as a reference image, thereby creating the motion vector and the predicted image. The motion compensation unit 160 makes a subtraction between the image of the P frame or B frame to be coded and the prediction image, and supplies the subtraction image to a DCT unit 120. Furthermore, the motion compensation unit 160 supplies the motion vector thus created to a variable-length coding unit 190.

The DCT unit 120 performs discrete cosine transform (DCT) processing for the image supplied from the motion compensation unit 160, and supplies the DCT coefficients thus obtained, to a quantization unit 130.

The quantization unit 130 performs quantization of the DCT coefficients and supplies the quantized DCT coefficients to the variable-length coding unit 190. The variable-length coding unit 190 performs variable-length coding processing for the motion vector supplied from the motion compensation unit 160, and the quantized DCT coefficients created based upon the subtraction image, thereby creating a coded stream. In the step of creation of the coded stream, the variable-length coding unit 190 sorts the coded frames in order of time.

Description has been made regarding coding processing for a P frame or B frame, in which the motion compensation unit 160 operates as described above. On the other hand, in a case of coding processing for an I frame, the I frame subjected to intra-frame prediction is supplied to the DCT unit 120 without involving the motion compensation unit 160. Note that this coding processing is not shown in the drawings.

The motion compensation unit 160 according to the present embodiment performs pre-reading of the search region for detecting the motion vector. First, description will be made regarding a typical configuration of the motion compensation unit 160 as an comparative example. Next, description will be made regarding a configuration of the motion compensation having a function of pre-reading.

Figure 8:
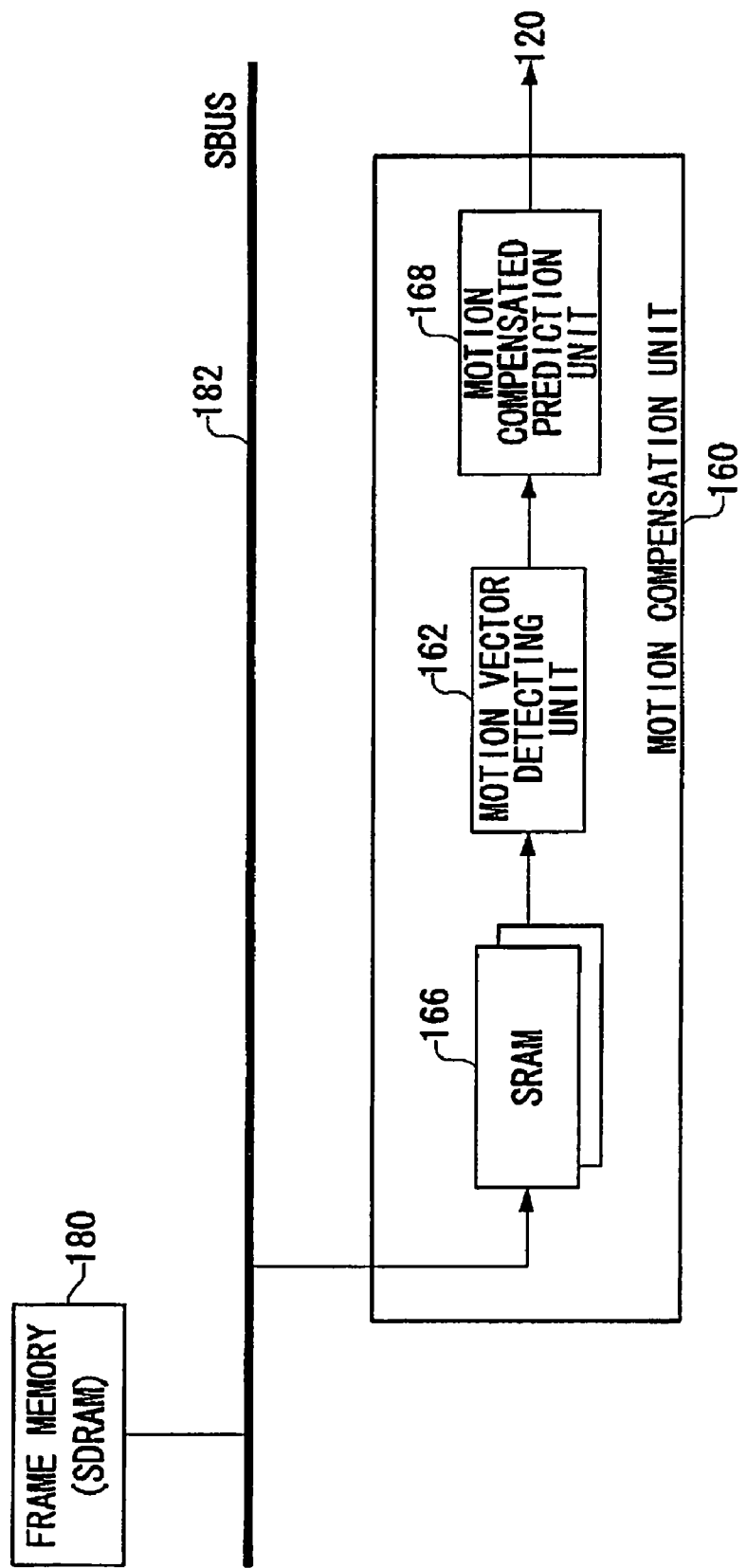
FIG. 8 is a diagram for describing a typical configuration of the motion compensation unit shown in FIG. 7.

FIG. 8 is a diagram for describing a typical configuration of the motion compensation unit 160. With such a configuration, the frame memory 180 and the motion compensation unit 160 are connected with each other via a SBUS 182. The motion compensation unit 160 makes a request to the frame memory 180 for the data by specifying the data address. Then, the motion compensation unit 160 receives the data transmitted from the frame memory 180 via the SBUS 182.

The motion compensation unit 160 includes SRAM 166, a motion vector detecting unit 162, and a motion compensated prediction unit 168. The motion vector detecting unit 162 transmits the pixel data of the reference image search region held by the frame memory 180 to the SRAM 166.

The frame memory 180 is made up of large-capacity SDRAM, and can be accessed via the SBUS 182, for example. On the other hand, the SRAM 166 is formed within the same integrated circuit in which the motion vector detecting unit 162 is formed. Such an arrangement enables high-speed access to the SRAM 166 from the motion vector detecting unit 162. The SRAM 166 has a limited storage capacity as compared with the frame memory 180; the SRAM 166 serves as high-speed cache memory for the frame memory 180. The SRAM 160 exhibits high-speed data transmission performance. With the present embodiment, the SRAM 166 is suitably employed as follows. That is to say, the motion vector detecting unit 162 performs motion vector detection while making reference to the pixel region stored in the SRAM 166. Note that, in general, the SRAM 166 is made up of multiple SRAM units, thereby providing the advantage of increased readout ports.

The motion vector detection unit 162 performs motion vector detection while making reference to the pixel data transmitted to the SRAM 166. The motion vector detecting unit 162 searches the reference image for the prediction macro block which exhibits the smallest deviation from the target macro block, and calculates the motion vector which represents the motion from the target macro block to the prediction macro block. The motion detection is performed by searching the reference image for the reference macro block matching the target macro block while shifting the reference macro block in integer or decimal increment of pixels. In general, the search processing is performed in the pixel region multiple times. Then, the reference macro block that most closely matches target macro block is selected as the prediction macro block based upon the multiple search results.

The motion compensated prediction unit 168 performs motion compensation processing for the target macro block using the motion vector, thereby creating the predicted image. Then, the motion compensated prediction unit 168 makes the subtraction image between the coding target image and the predicted image, and outputs the subtraction image to the DCT Unit 120.

Let us consider a motion vector detection method such as a tracking method and gradient method, in which search processing is repeatedly performed during calculation of the search direction. In this case, the pixel data used for each instance of search processing is transmitted to the SRAM 166 from the frame memory 180. Let us consider motion vector detection in which the 16×16 pixels predicted macro block which most closely matches the target macro block is detected based upon search results from six search instances. In this case, image data with a width of 21 pixels and a height of 21 pixels, including the pixels around the macro block, is transmitted to the SRAM 166 for each search processing. This transmission is repeated six times. Accordingly, motion vector detection requires a data transmission amount of 21×21×6 pixels, i.e., 2646 bytes, for each target macro block. Note that description has been (and will be) made with the information amount of each pixel as 1 byte, for convenience of explanation. With the tracking method and the gradient method, the data transmission amount is determined corresponding to the number of search cycles.

Also, another motion vector detection method, i.e., entire macro block search method is known, in which matching processing is performed between the target macro block and each one of all the macro blocks set in a predetermined search region, and the macro block that most closely matches target macro block is selected as the predicted macro block. With the entire macro block search method, all the pixel data of a predetermined search region is transmitted from the frame memory 180 to the SRAM 166. In this case, the motion vector detection unit 162 searches the pixel region transmitted to the SRAM 166 for the motion vector. The entire macro block search method requires only one-time data transmission. Let us consider an arrangement in which the motion vector is detected for the target macro block with a width of 16 pixels and height of 16 pixels with reference to a search region with the target macro block region as the center, and with a size of 48×48 pixels. With such an arrangement, motion vector detection requires a data transmission amount of 48×48 pixels, i.e., 2304 bytes, for each target macro block.

With the tracking method and the gradient method, while the data transmission amount is small for each instance of search processing, high-precision motion vector detection requires an increased number of search cycles. This leads to an increased data transmission amount which is proportional to the number of search cycles. This in turn results in reduced processing performance due to the limited performance of data transmission from the frame memory 180 to the SRAM 166, i.e., bottleneck. On the other hand, with the entire macro block search method, motion vector detection requires only one-time data transmission for each target macro block. However, with such an arrangement, the pixel data of the entire search region is transmitted from the frame memory 180 to the SRAM 166 for each motion vector detection. This leads to long data transmission time, resulting in reduced processing performance.

With the tracking method and the gradient method, the pixel data is transmitted every time that the reference macro block is shifted within the reference image in integer or decimal increments of pixels. In this case, most of the transmitted data matches the pixel data which has been transmitted for the previous motion vector detection. Accordingly, such data transmission, in which all the necessary pixel data is transmitted for each instance of search processing, reduces the efficiency of the motion vector detection. On the other hand, with the entire macro block search method, the pixel data of the entire search region is transmitted from the frame memory 180 to the SRAM 166. This means that the transmitted pixel data includes even the pixel data of a search region which is extremely infrequently used as a reference. Accordingly, with such an arrangement, data transmission is not performed with optimum efficiency.

As described above, in general, conventional techniques have a problem of inefficient data transmission from the frame memory 180 to the SRAM 166. Such data transmission takes up most of the transmission bandwidth of the SBUS 182. As a result, this leads to a bottleneck in the coding processing. In view of the aforementioned problems, the present applicant has found an improved method for data transmission from the frame memory 180. Description will be made below regarding various configurations and operations of the motion compensation unit 160, which provide improved data transmission from the frame memory 180.

Figure 9:
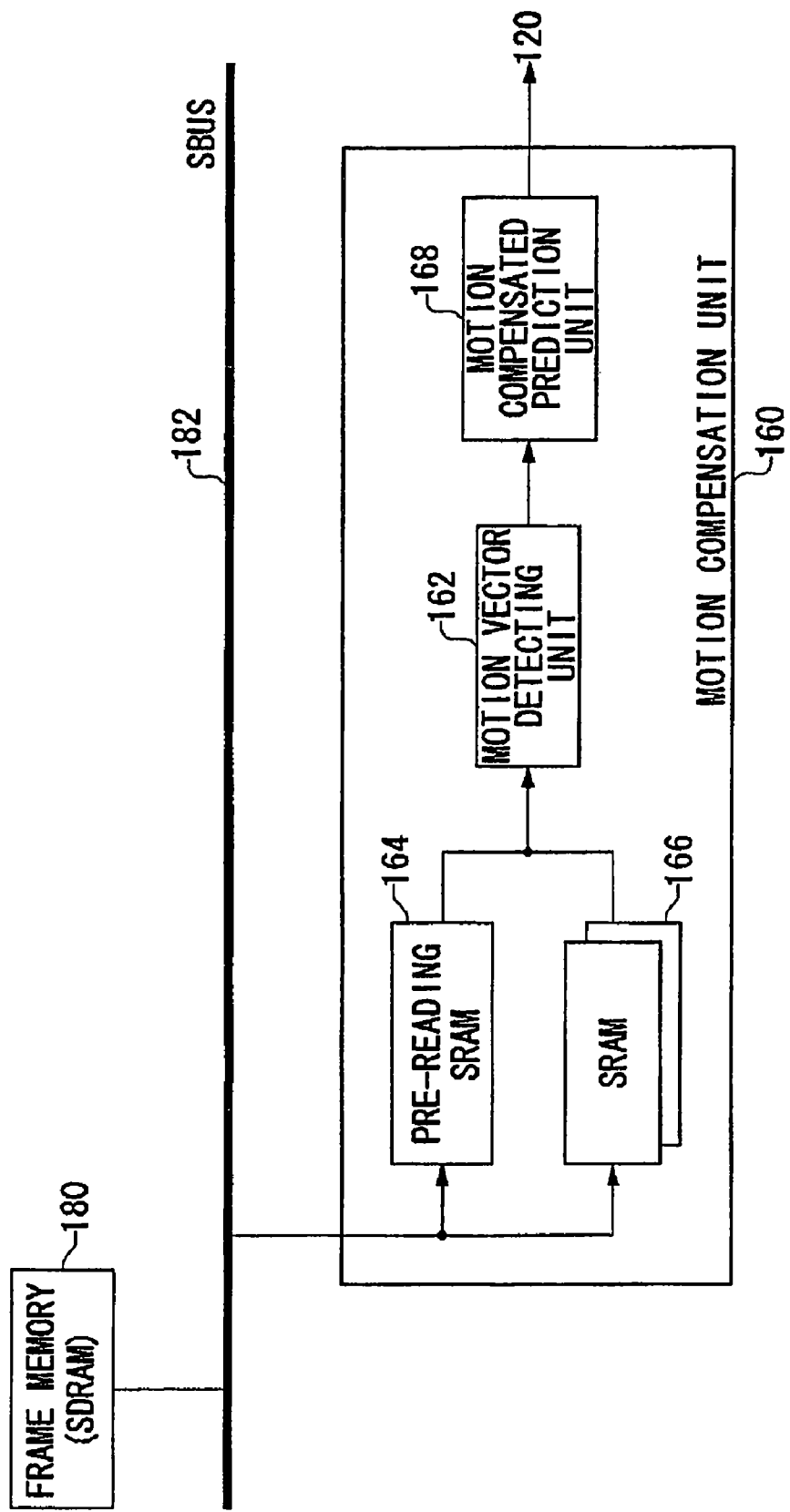
FIG. 9 is a diagram for describing a configuration of the motion compensation unit shown in FIG. 7.

FIG. 9 is a diagram for describing a configuration of the motion compensation unit 160. Note that the same components as those of the aforementioned typical configuration shown in FIG. 8 are denoted by the same reference numerals, and description thereof will be omitted.

In addition to the general SRAM 166 included in the aforementioned arrangement having a typical configuration, the motion compensation unit 160 further includes pre-reading SRAM 164 for holding pixel data transmitted from the frame memory 180. The motion vector detecting unit 162 selects the data of the pixel region which is frequently used as a reference within a predetermined search region in the reference image held by the frame memory 180. Then, the motion vector detecting unit 162 transmits the data of the pixel region thus selected from the frame memory 180 to the pre-reading SRAM 164. On the other hand, the motion vector detecting unit 162 transmits the necessary pixel data used as a reference for motion vector detection, from the frame memory 180 to the SRAM 166. Note that the pixel data already held by the pre-reading SRAM 164 is not transmitted from the frame memory 180 to the SRAM 166. In this case, the pixel data held by the pre-reading SRAM 164 is used with a higher priority.

With the present arrangement, in a case that the necessary pixel data, which is to be used as a reference for the current instance of search processing, is stored in the pre-reading SRAM 164, the motion vector detecting unit 162 reads out the pixel data from the pre-reading SRAM 164. On the other hand, in a case that the necessary pixel data, which is to be used as a reference for the current instance of search processing, is not stored in the pre-reading SRAM 164, the motion vector detecting unit 162 transmits the necessary pixel data from the frame memory 180 to the SRAM 166, and uses the necessary pixel data as a reference.

Before the next detection of the motion vector for the next target macro block, the motion vector detecting unit 162 transmits the pixel data which is frequently used as a reference for detecting the motion vector of the next target macro block from the frame memory 180 to the pre-reading SRAM 164. Thus, the data held by the SRAM 164 is updated.

The motion vector detecting unit 162 has a function of switching the reference memory between the pre-reading SRAM 164 and the SRAM 166 for making reference to the data. This prevents inefficient data transmission in which the redundant data is repeatedly transmitted from the frame memory 180, thereby reducing the data transmission amount from the frame memory 180. Let us consider an arrangement in which the pre-reading SRAM 164 holds a 40×40 pixel region as pre-read data before motion vector detection is performed for a 16×16 pixel macro block based upon search results from six search instances. Let us say that all the pixel data, which is used as references for the six search cycles, is stored in the pre-reading SRAM 164. In this case, motion vector detection for this target macro block requires only one-time data transmission to the pre-reading SRAM 164. Specifically, the motion vector detection for this single target macro block requires a data transmission amount of 40×40 pixels, i.e., 1600 bytes.

As described above, the motion vector detecting unit 162 reads out the pixel data which is used as a reference for the current motion vector detection for the target macro block from the frame memory 180 beforehand, and transmits the pixel data thus read out, to the pre-reading SRAM 164. With the present embodiment, the data which is to be transmitted beforehand to the pre-reading SRAM 164 is determined based upon the determination conditions as follows.

(1) Determination Based Upon the Motion Vector of the Surrounding Macro Block

Let us consider a case in which there is a surrounding macro block, for which the motion vector has already been detected, around the current target macro block. In this case, determination is made that there is a high probability that the pixel region which is used as a reference for the current target macro block also includes the pixel region of the macro block predicted based upon the motion vector of the aforementioned surrounding macro block and the pixel region thereof around. Accordingly, the motion vector detecting unit 162 transmits such a pixel region beforehand to the pre-reading SRAM 164.

(2) Determination Based Upon the Motion Vector of the Entire Screen

Let us consider a case in which the screen scrolling operation moves the entire screen. In this case, the motion vector detecting unit 162 determines that there is a high probability that the pixel region which is used as a reference for the current target macro block includes the pixel region predicted based upon the scrolling conditions. Accordingly, the motion vector detecting unit 162 transmits such a pixel region beforehand to the pre-reading SRAM 164.

(3) Determination Based Upon the Motion Vector of the Macro Block Set at the Same Position in a Prior or Upcoming Frame The motion vector detecting unit 162 predicts the pixel region which is frequently used as a reference for motion vector detection for the target macro block, based upon the motion vector of the reference macro block, situated at the same position as that of the target macro block, in a prior or upcoming frame. Then, the motion vector detecting unit 162 transmits the pixel region thus predicted, to the pre-reading SRAM 164.

Such a determination is particularly effective in motion vector detection for a case in which there is a correlation between the motions of the image with respect to time, and specifically in a case in which the motion of the target macro block in the coding target frame can be predicted with a certain precision based upon the motion vector of a prior or upcoming frame. Let us say that the motions of the image is represented by a liner motion model. In this case, the search region can be roughly determined by linear prediction of the motion.

In some cases, the position of the target macro block does not match that of the reference macro block. For example, in some cases, the position of the pixel changes by screen scrolling or the like. In this case, while the position of the target macro block does not match that of the corresponding reference macro block. In such a case, the pixel region, which is used as a reference for motion vector detection for the target macro block, should be predicted based upon the motion vector of the reference macro block corresponding to the target macro block.

(4) Setting of the Reference Region to a Region of a Predetermined Size with the Target Macro Block as the Center In this case, the motion vector detecting unit 162 determines that there is a high probability that the pixel region which is used as a reference for the current target macro block includes a pixel region having a greater size than that of the target macro block by a predetermined number of pixels, with the target macro block as the center. Then, the motion vector detecting unit 162 transmits the pixel region thus predicted, to the pre-reading SRAM 164. Such a determination is particularly effective in motion vector detection for a case in which the image motion is sufficiently gradual. In such a case, there is a high probability that the reference macro block that most closely matches target macro block is detected within a limited region with the target macro block as the center. Note that the width and the height of the aforementioned reference pixel region with the target macro block as the center are adjusted based upon the image size, i.e., the resolution.

(5) Determination Based Upon the Search Region Identified in the Prior Paths

Let us consider a case in which coding is performed through multiple paths. In this case, the motion vector detecting unit 162 determines that there is a high probability that the search region which is used as a reference in the current path also includes the search region identified in the prior paths. Accordingly, the motion vector detecting unit 162 transmits such a search region beforehand to the pre-reading SRAM 164.

The size of the region for which the pixel data is transmitted beforehand to the pre-reading SRAM 164 may be adjustable. In some cases, there is a need to dynamically adjust the pixel region to be searched, depending upon factors such as the amount of change in the motion, or the precision required for motion vector detection. Also, in some cases, the capacity of the pre-reading SRAM 164 is limited depending upon device design restrictions where the coding device 100 is mounted. Furthermore, in some cases, the pre-reading SRAM 164 can incorporate additional SRAM units, depending upon the type of the device. Accordingly, the system needs to have a configuration which enables the pixel data size of the pre-reading region to be adjusted as appropriate corresponding to the limitations in the capacity of the pre-reading SRAM 164, and limitations on the usage thereof. The pre-reading data size is determined based upon the following conditions.

(1) The size and deviation of the search region is estimated based upon the motion vectors of the surrounding macro blocks, and the pre-reading data size is determined based upon the estimation results.

(2) The pre-reading data size is determined based upon the motion vector of the entire image in cases such as screen scrolling.

(3) The size of the search region is estimated based upon the motion vector of the macro block at the same position in a prior or upcoming frame, and the pre-reading data size is determined based upon the estimation results.

(4) Determination is made whether or not there is a large amount of motion between frames of the motion images based upon information received from external devices, i.e., the photographing mode, and determines the pre-reading data size based upon the determination results.

Figure 10:
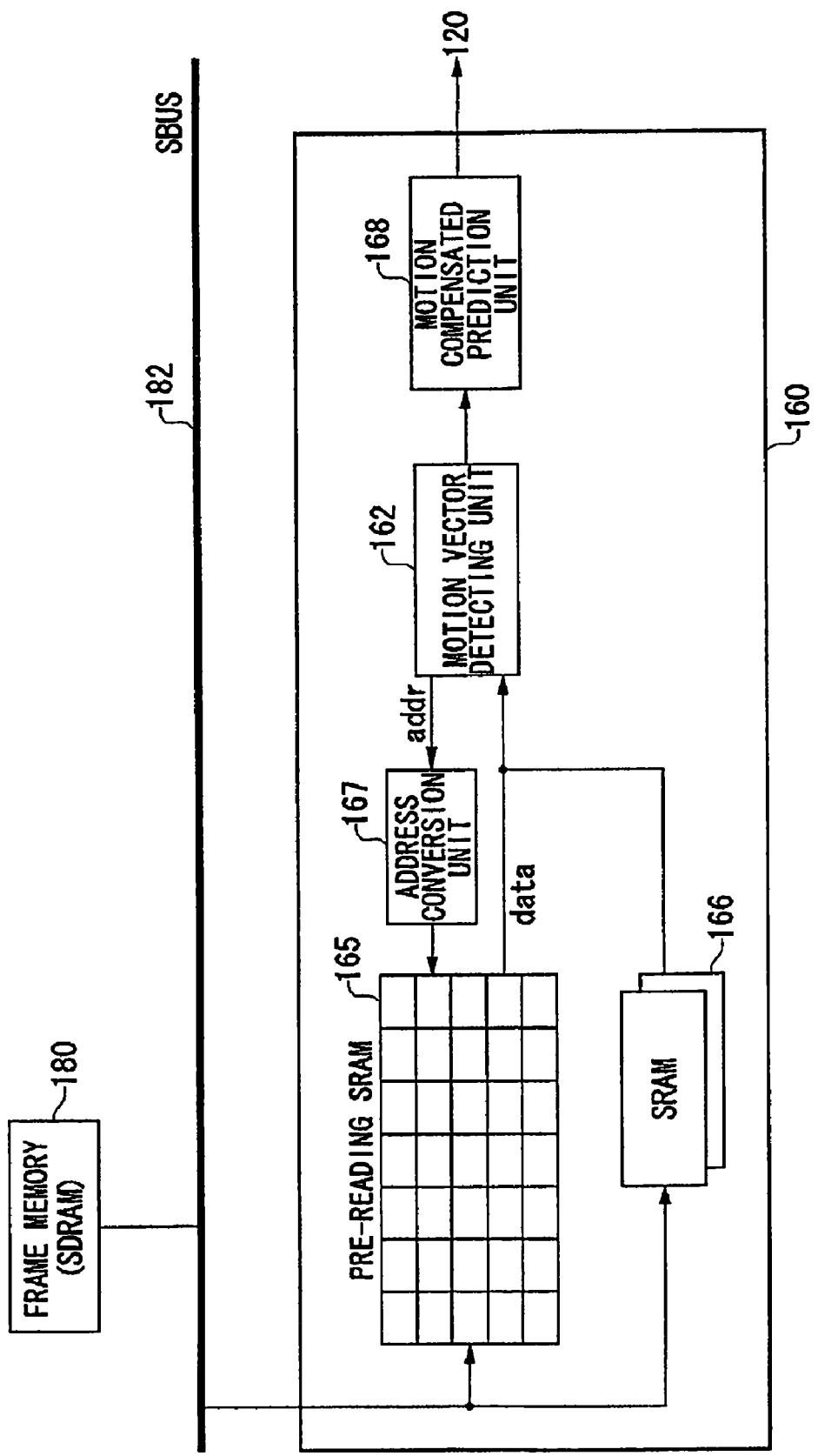
FIG. 10 is a diagram for describing another configuration of the motion compensation unit shown in FIG. 7.

FIG. 10 is a diagram for describing another configuration of the motion compensation unit 160. In this configuration, the pre-reading SRAM 165 is divided into multiple tile-shaped memory units (which will be referred to as "memory tile units" hereafter). Such a configuration allows the data to be updated in increments of memory tile units. The motion vector detecting unit 162 transmits the pixel region which is a part of the reference image held by the frame memory 180 and is to be frequently used as a reference to the memory tile units forming the pre-reading SRAM 165.

Before the next search for the motion vector of the next target macro block, the motion vector detecting unit 162 updates the data stored in the pre-reading SRAM 165. The motion vector detecting unit 162 having such a configuration shown in FIG. 10 updates the data in increments of memory tile units.

Let us consider a case in which there is a correlation between the previous target macro block and the current target macro block. In this case, the search regions of these macro blocks usually match one another. Furthermore, in many cases, the pixel regions of these two macro blocks which are frequently used as references match one another. With the present arrangement, at the time of update of the pixel data which has been used as a reference for the previous motion vector detection for the previous target macro block, the motion vector detecting unit 162 does not discard the data which is to be frequently used as a reference for the current motion vector detection for the current target macro block. The data thus remaining in the pre-reading SRAM 165 in increments of memory tile units are used as a reference again for the current motion detection for the current target macro block.

Let us say that part of the data which had been frequently used as a reference for the previous motion vector detection for the previous target macro block is not used as a reference for the current motion vector detection for the current target macro block. In this case, the motion vector detecting unit 162 removes such data from the pre-reading SRAM 165 in increments of memory tile units. Subsequently, the motion vector detecting unit 162 transmits the pixel data which is to be frequently used as a reference for the current motion vector detection for the current target macro block to the memory tile units from which the data has been removed, thereby storing the data thus transmitted in these memory tile units.

The frame memory 180 stores image data in a manner in which pixel positions in an image correspond to the positions in the storage area. On the other hand, the pre-reading SRAM 165 updates the data in increments of memory tile units. Accordingly, unlike the frame memory 180, the pre-reading SRAM 165 does not store image data in a manner in which pixel positions in an image correspond to positions in the storage area. With the present arrangement, a reference table is provided for storing the position correspondence between each pixel position in an image and the corresponding position in the storage area.

Upon receiving the reference address, which indicates the pixel position in an image from the motion vector detecting unit 162, an address conversion unit 167 converts the reference address thus received, into the real address which indicates the actual storage position in the pre-reading SRAM 165. Then, the address conversion unit 167 supplies the real address to the pre-reading SRAM 165. The pre-reading SRAM 165 outputs the pixel data stored at the real address specified by the address conversion unit 167 to the motion vector detecting unit 162.

The present arrangement employs the pre-reading SRAM 165 having a function of updating data in increments of memory tile units. Such an arrangement enables the following operation. Let us say that the search regions overlap with each other between two target macro block set for consecutive motion vector detections. In this case, with the present arrangement, a part of the pixel region which can be shared for the next motion vector detection is not removed, and is used again for the next motion vector detection for the next target macro block. This further reduces the data transmission amount from the frame memory 180. Thus, such an arrangement suppresses overloading of the SBUS 182.

Figure 11:
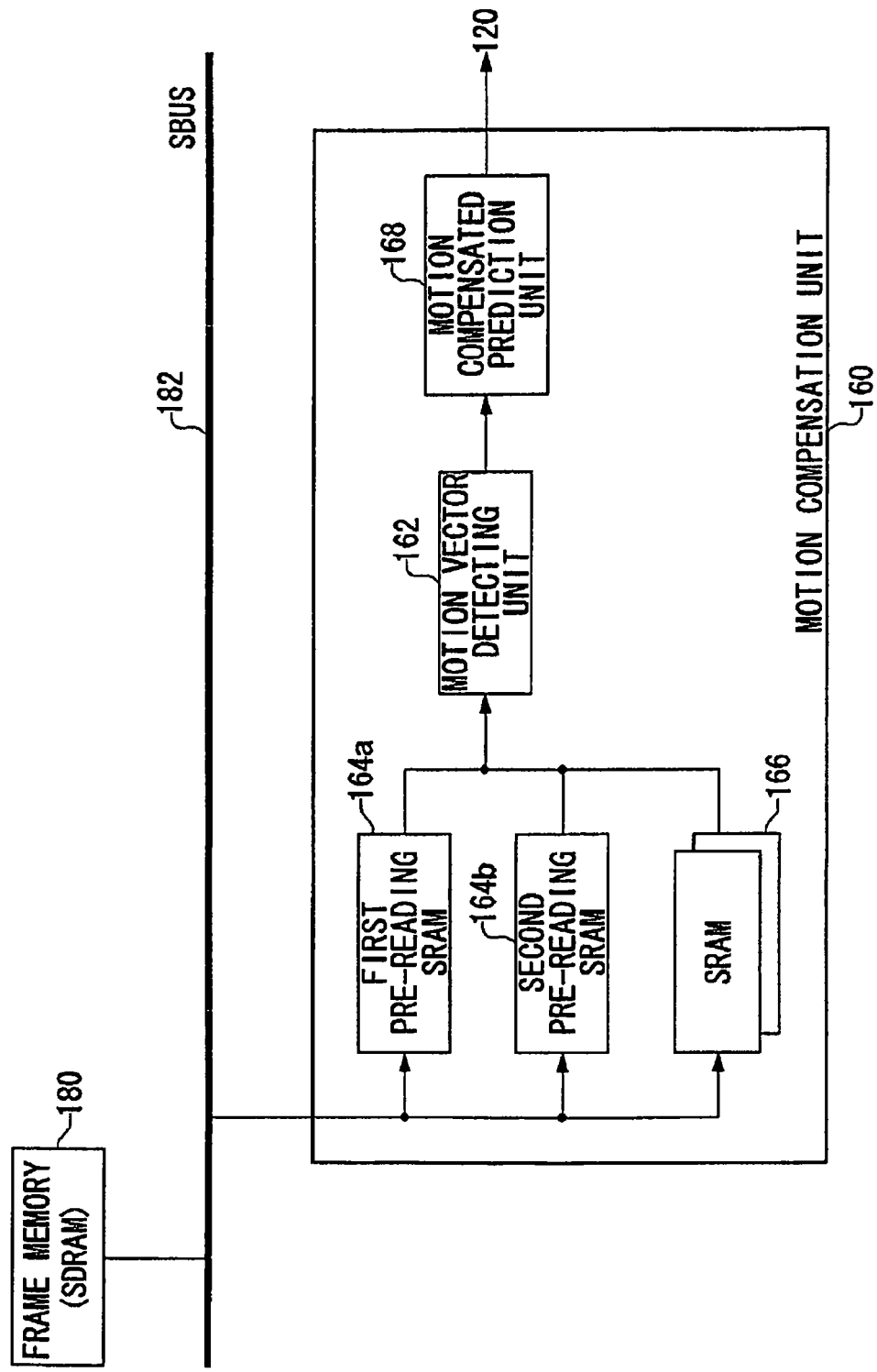
FIG. 11 is a diagram for describing yet another configuration of the motion compensation unit shown in FIG. 7.

FIG. 11 is a diagram for describing yet another configuration of the motion compensation unit 160. The present arrangement includes a first pre-reading SRAM 164a and a second SRAM 164b. The first pre-reading SRAM 164a is used for transmitting beforehand the pixel data which is frequently used as a reference for the current motion vector detection for the current target macro block. On the other hand, the second pre-reading SRAM 164b is used for transmitting beforehand the pixel data which is frequently used as a reference for the next motion vector detection for the next target macro block.

With the present arrangement, at the time the motion vector detection for the next target macro block begins, the pixel data has already been transmitted to the second pre-reading SRAM 164b. Thus, the present arrangement can perform motion vector detection consecutively immediately after a previous motion vector detection. Also, an arrangement may be made in which the pre-reading pixel region of the image data for the next target macro block is determined based upon the motion vector detection results for the current target macro block, and the pixel data of the pre-reading pixel region thus determined is transmitted to the second pre-reading SRAM 164b. Let us consider a case in which a part of the pixel data of the pre-reading pixel region for the current target macro block can be shared for the next motion vector detection for the next target macro block. In this case, an arrangement may be made in which such data is transmitted from the first pre-reading SRAM 164a to the second pre-reading SRAM 164b.

Description has been made regarding an arrangement in which the pre-reading SRAM 164 and the usual SRAM 166 are provided as physically separate units. Also, an arrangement may be made in which a single SRAM unit is logically divided into a pre-reading memory area used as the pre-reading SRAM 164 and a general memory area used as the second SRAM 166.

Description has been made regarding the present invention with reference to the aforementioned embodiments. The above-described embodiments have been described for exemplary purposes only, and are by no means intended to be interpreted restrictively. Rather, it can be readily conceived by those skilled in this art that various modifications may be made by making various combinations of the aforementioned components or the aforementioned processing, which are also encompassed in the technical scope of the present invention.

What is claimed is:

1. A coding device which performs coding of frames of motion images, comprising:
   a frame memory which holds a reference frame that is to be referenced for motion detection for a target block of a coding target frame in motion images;
   a motion compensation unit, that includes a motion detecting unit and a motion compensated prediction unit, said motion detecting unit for detecting the motion of said target block by repeated motion estimation with reference to said reference frame stored in said frame memory, and said motion compensated prediction unit for performing motion compensation processing for the target block using information on the detected motion, thereby creating a predicted image, and then making a subtraction image between the coding target frame and the predicted image; and
   a coding unit that performs coding processing for the subtraction image and the information on the detected motion and thereby creates a coded stream, wherein said motion compensation unit further includes a pre-reading memory which stores pixel data beforehand, where said pixel data is part of pixel data in said reference frame, which is to be frequently referenced for motion detection, and which has been transmitted from said frame memory.

2. A coding device according to claim 1, wherein said pre-reading memory is provided within an integrated circuit of said motion compensation unit.

3. A coding device according to claim 2, wherein said motion compensation unit further includes a second memory in addition to said pre-reading memory, for holding pixel data which is to be referenced, and which is transmitted from said frame memory for each motion estimation, and wherein said motion detecting unit stores pixel data of a reference pixel, which is not held in said pre-reading memory, in said second memory to be referenced.

4. A coding device according to claim 2, wherein the storage area of said pre-reading memory is divided into multiple memory tile units, and has a configuration which enables data to be updated in increments of the memory tile units, and wherein at the time of starting motion detection for the target block, the pixel data which has been stored in at least part of the memory tile units and has been referenced for the previous motion detection for the previous target block is referenced by said motion detecting unit again for the motion detection for the current target block without such pixel data being discarded.

5. A coding device according to claim 1, wherein said motion compensation unit further includes a second memory in addition to said pre-reading memory, for holding pixel data which is to be referenced, and which is transmitted from said frame memory for each motion estimation, and wherein said motion detecting unit stores pixel data of a reference pixel, which is not held in said pre-reading memory, in said second memory to be referenced.

6. A coding device according to claim 1, wherein the storage area of said pre-reading memory is divided into multiple memory tile units, and has a configuration which enables update of data in increments of the memory tile units, and wherein at the time of starting motion detection for the target block, the pixel data which has been stored in at least part of the memory tile units and has been referenced for the previous motion detection for the previous target block is referenced by said motion detecting unit again for the motion detection for the current target block without such pixel data being discarded.

7. A coding device according to claim 1, wherein the pixel data which is to be frequently referenced, and which is transmitted beforehand from said frame memory to said pre-reading memory, is the pixel data of a region including the region of said target block and a region therearound with said target block in the center thereof.

8. A coding device according to claim 7, wherein the size of a region of pixel data which is to be frequently referenced and is transmitted beforehand from said frame memory to said pre-reading memory is set to a value corresponding to said target block.

9. A coding device according to claim 1, wherein the pixel data which is to be frequently referenced, and which is transmitted beforehand from said frame memory to said pre-reading memory, is the pixel data of a region corresponding to a predicted block obtained by motion detection for other blocks around said target block.

10. (Previously Presentednded) A coding device according to claim 9, wherein the size of a region of pixel data which is to be frequently referenced and is transmitted beforehand from said frame memory to said pre-reading memory is set to a value corresponding to said target block.

11. A coding device according to claim 1, wherein the pixel data which is to be frequently referenced, and which is transmitted beforehand from said frame memory to said pre-reading memory, is the pixel data of a region predicted by motion detection for a reference block situated at the position in a prior or upcoming frame in said motion images which corresponds to said target block.

12. A coding device according to claim 11, wherein the size of a region of pixel data which is to be frequently referenced and is transmitted beforehand from said frame memory to said pre-reading memory is set to a value corresponding to said target block.

13. A coding method comprising:
holding in a frame memory a reference frame that is to be referenced for motion detection for a target block of a coding target frame in motion images;
detecting the motion of said target block by repeated motion estimation with reference to said reference frame stored in said frame memory; performing motion compensation processing for the target block using information on the detected motion, thereby creating a predicted image, and then making a subtraction image between the coding target frame and the predicted image; and
performing coding processing for the subtraction image and the information on the detected motion and thereby creating a coded stream, wherein at the time of motion detection for [a] the target block , pixel data which is part of pixel data in motion search region within the reference frame and is to be frequently referenced is transmitted beforehand from the frame memory holding said reference frame to a pre-reading memory, and wherein, in a case that said pre-reading memory holds pixel data to be referenced for motion estimation, the pixel data held by said pre-reading memory is referenced for motion estimation, and otherwise, in a case that said pre-reading memory does not hold pixel data to be referenced for motion estimation, pixel data held by said frame memory is referenced for motion estimation.

* * * * *